(12) United States Patent
Bierwirth et al.

(10) Patent No.: US 11,155,234 B2
(45) Date of Patent: Oct. 26, 2021

(54) GAS GENERATOR, AIRBAG MODULE AND MOTOR VEHICLE SAFETY SYSTEM

(71) Applicant: TRW AIRBAG SYSTEMS GMBH, Aschau a. Inn (DE)

(72) Inventors: Sebastian Bierwirth, Rechtmehring (DE); Johannes Ebner, Mühldorf am Inn (DE); Martin Oberstarr, Polling (DE)

(73) Assignee: TRW AIRBAG SYSTEMS GMBH, Aschau a Inn (DE)

( * ) Notice: Subject to any disclaimer, the term of this patent is extended or adjusted under 35 U.S.C. 154(b) by 110 days.

(21) Appl. No.: 16/465,157

(22) PCT Filed: Nov. 8, 2017

(86) PCT No.: PCT/EP2017/078564
§ 371 (c)(1),
(2) Date: May 30, 2019

(87) PCT Pub. No.: WO2018/099700
PCT Pub. Date: Jun. 7, 2018

(65) Prior Publication Data
US 2019/0291684 A1    Sep. 26, 2019

(30) Foreign Application Priority Data

Dec. 2, 2016 (DE) .......................... 102016123312.9

(51) Int. Cl.
*B60R 21/264* (2006.01)
*B60R 21/272* (2006.01)
*B60R 21/26* (2011.01)

(52) U.S. Cl.
CPC ........ *B60R 21/2644* (2013.01); *B60R 21/272* (2013.01); *B60R 2021/26011* (2013.01)

(58) Field of Classification Search
CPC .............. B60R 21/2644; B60R 21/272; B60R 2021/26011; B60R 21/16; B60R 21/26
(Continued)

(56) References Cited

U.S. PATENT DOCUMENTS 5,660,412 A    8/1997    Renfroe et al.
6,010,153 A *  1/2000    Halas .................... B60R 21/272
                                                              280/737
(Continued)

FOREIGN PATENT DOCUMENTS

CN    105984419    10/2016
DE    19822654     11/1999
(Continued)

*Primary Examiner* — James A English
*Assistant Examiner* — Kurtis Nielson
(74) *Attorney, Agent, or Firm* — Tarolli, Sundheim, Covell & Tummino LLP

(57) ABSTRACT

The invention relates to an inflator (10) comprising an ignition unit (30) having an igniter (31), a chamber (20) arranged axially downstream of the ignition unit (30) and a diffuser chamber (40) arranged axially downstream of the chamber (20) which is comprised by a diffuser (42), wherein a combustion chamber screen (50) having an igniter-side end (51) and a diffuser-side end (52) is disposed in the chamber (20), the combustion chamber screen (50) being tapered, especially conically, in the longitudinal direction (L) of the inflator (10) from the igniter (31) toward the diffuser (42).

18 Claims, 5 Drawing Sheets

(58) Field of Classification Search
USPC .......................................................... 280/736
See application file for complete search history.

(56) References Cited

U.S. PATENT DOCUMENTS

| | | | |
|---|---|---|---|
| 6,412,816 B1 | 7/2002 | Gast et al. | |
| 7,866,692 B2* | 1/2011 | Windhausen | B60R 21/2644 280/736 |
| 8,720,947 B2* | 5/2014 | Ozaki | C06D 5/00 280/741 |
| 2003/0025313 A1* | 2/2003 | Sawa | B60R 21/2644 280/741 |
| 2004/0232680 A1* | 11/2004 | Goetz | B60R 21/261 280/742 |
| 2005/0029785 A1* | 2/2005 | Bilbrey | B60R 21/272 280/736 |
| 2007/0080529 A1* | 4/2007 | Meixner | B60R 21/261 280/740 |
| 2008/0061540 A1* | 3/2008 | Smith | B60R 21/272 280/736 |
| 2008/0284146 A1* | 11/2008 | Hirooka | B60R 21/2644 280/736 |
| 2009/0039628 A1* | 2/2009 | Zengerle | B60R 21/2646 280/736 |
| 2009/0283006 A1* | 11/2009 | Abaziou | B60R 21/2644 102/530 |
| 2012/0048137 A1* | 3/2012 | Hagihara | C06D 5/06 102/530 |
| 2013/0233197 A1* | 9/2013 | Ozaki | C06D 5/00 102/531 |
| 2014/0230685 A1* | 8/2014 | Hanano | B60R 21/2644 102/530 |
| 2015/0266442 A1* | 9/2015 | Saito | B60R 21/2037 280/728.2 |
| 2016/0257280 A1* | 9/2016 | Hanano | B60R 21/2644 |
| 2017/0028964 A1* | 2/2017 | Bierwirth | B60R 21/26 |
| 2017/0050609 A1* | 2/2017 | Yamashita | B60R 21/2644 |
| 2019/0152423 A1* | 5/2019 | Fukumoto | B60R 21/264 |
| 2019/0351864 A1* | 11/2019 | Hillmann | B60R 21/272 |

FOREIGN PATENT DOCUMENTS

| | | | | |
|---|---|---|---|---|
| DE | 19913145 | | 10/2000 | |
| DE | 202004012722 | | 12/2004 | |
| DE | 10333173 | A1 * | 2/2005 | ......... B60R 21/2644 |
| DE | 102013216401 | | 2/2015 | |
| DE | 102013216401 | A1 * | 2/2015 | ......... B60R 21/2644 |
| DE | 102014016521 | A1 * | 5/2016 | ................ F42B 3/04 |
| DE | 102016124679 | A1 * | 6/2018 | ......... B60R 21/2644 |
| WO | WO-02062629 | A1 * | 8/2002 | ............ B60R 21/272 |

* cited by examiner

GAS GENERATOR, AIRBAG MODULE AND MOTOR VEHICLE SAFETY SYSTEM

RELATED APPLICATIONS

This application corresponds to PCT/EP2017/078564, filed Nov. 8, 2017, which claims the benefit of German Application No. 10 2016 123 312.9, filed Dec. 2, 2016, the subject matter of which are incorporated herein by reference in their entirety.

BACKGROUND OF THE INVENTION

The invention relates to an inflator. Further, the invention relates to an airbag module comprising an inflator according to the invention and a motor vehicle safety system comprising an inflator according to the invention or an airbag module according to the invention.

It is known that inflators include combustion chamber screens. The latter serve especially for withholding clinker or propellant particles which are formed upon activation of the inflator and can be transported within a gas flow of combustion gas to be formed within the inflator. Prior art combustion chamber screens frequently have the drawback that the flow through the combustion chamber screens, which may also be referred to as combustion chamber filters, is non-uniform so that a non-uniform filtering effect as regards withholding or filtering clinker or propellant particles may occur. Moreover, the space for propellant is frequently strongly restricted by known designs of combustion chamber screens.

There is a constant drive for optimizing the flow, especially the flow of combustion gas, in chambers of inflators, preferably in combustion chambers or filter chambers. Moreover, it is often necessary to make available as much space or construction space as possible for a propellant, especially for a propellant bed.

SUMMARY OF THE INVENTION

It is the object of the invention to state a developed inflator comprising a combustion chamber screen, wherein the flow in a chamber, especially in a gas chamber, of the inflator is optimized. Moreover, a screening or filtering surface of the combustion chamber screen is intended to be uniformly used, especially flown through. It is another object of the invention to enable the inflator to be easily manufactured, especially to enable facilitated assembly of the combustion chamber screen inside the inflator. At the same time, maximum space or construction space is intended to be provided for propellant present in a chamber.

Moreover, it is an object of the invention to state an airbag module as well as a motor vehicle safety system comprising a developed inflator.

According to the invention, this object is achieved with respect to an inflator by the subject matter of claim 1, with respect to an airbag module by the subject matter of claim 12 and with respect to a motor vehicle safety system by the subject matter of claim 13.

For achieving the afore-mentioned objects, the invention provides an inflator which provides an ignition unit comprising an igniter, a chamber arranged axially downstream of the ignition unit and a diffuser chamber arranged axially downstream of the chamber and being encompassed by a diffuser. The inflator further comprises a combustion chamber screen having an igniter-side end and a diffuser-side end and being arranged in the chamber. The combustion chamber screen is tapered, especially conically, in the longitudinal direction of the inflator from the igniter toward the diffuser.

The chamber may be a compressed gas chamber which, in the idle state of the inflator, i.e. prior to activation thereof, comprises compressed gas or a compressed gas mixture under pressure. Accordingly, the inflator according to the invention may be a hybrid inflator. It is further possible that the chamber is a combustion chamber which, apart from propellant, includes merely atmospheric pressure so that the inflator may be a pyrotechnical inflator.

The chamber wall, especially the wall of the compressed gas chamber, is part of the outer housing of the inflator.

Due to the combustion chamber screen designed according to the invention, on the one hand, the flow and, resp., the gas flow of combustion gases in the combustion chamber formed after activation of the inflator is optimized. Further, a screen or filter surface of the combustion chamber screen is used optimally, especially uniformly.

The combustion chamber screen may be made from expanded metal and/or perforated sheet and/or fabric. The combustion chamber screen may be especially a tapered cone segment, especially a truncated cone segment. The length of the combustion chamber screen may correspond especially to a quarter of the length of the chamber, especially to one third of the length of the chamber, especially to half of the length of the chamber. The length of the combustion chamber screen corresponds to the longitudinal extension of the combustion chamber screen, i.e. to the extension from the igniter-side end to the diffuser-side end of the combustion chamber screen.

A portion of the combustion chamber screen having the maximum diameter, especially the igniter-side end of the combustion chamber screen, may be dimensioned so that the combustion chamber screen abuts on an inner face of a chamber wall of the chamber by means of (slight) press-fit.

The igniter-side end of the combustion chamber screen preferably does not abut on the igniter. Rather, it is the end of the combustion chamber screen which points toward the ignition unit and, resp., is oriented in the direction of the ignition unit. The diffuser-side end of the combustion chamber screen preferably does not abut on the diffuser chamber, either. Rather, the diffuser-side end of the combustion chamber screen is the end of the combustion chamber screen which points in the direction of the diffuser chamber and, resp., is oriented in the direction of the diffuser chamber. Preferably, the combustion chamber screen, especially the igniter-side end of the combustion chamber screen, is designed and, resp., dimensioned so that no propellant present in the chamber can penetrate between the outer face of the combustion chamber screen and the inner face of the chamber wall of the chamber.

The combustion chamber screen may also be referred to as filter bag. Preferably, the combustion chamber screen has a rotation-symmetric truncated cone shape. Inside the combustion chamber screen, i.e. in the hollow portion formed by the inner face of the combustion chamber screen, propellant, especially in the form of propellant tablets and/or propellant pellets and/or propellant granules and/or propellant rings and/or preferably extruded molded bodies, may be provided. The chamber portion between the ignition unit and the combustion chamber screen may be equally (completely) filled with propellant.

Of preference, a cross-section of a clearance through which combustion gas may flow and which is formed between the combustion chamber screen and the inner face of the chamber wall increases, especially continuously, in the longitudinal direction of the inflator, preferably in a main flow direction of the combustion gas. The main flow direction of the combustion gas extends substantially in parallel to the longitudinal axis of the inflator. The cross-section through which combustion gas can flow is formed especially between the outer face of the combustion chamber screen and the inner face of the chamber wall, especially the inner face of the portion of the chamber wall surrounding the combustion chamber screen.

The combustion chamber screen preferably has, fully circumferentially, a filter surface through which combustion gas may flow from the inside, i.e. starting from the longitudinal axis of the combustion chamber screen to the outside, i.e. in the direction of the outer face of the combustion chamber screen. When, in the operating case, combustion gas or, resp., gas has flown through the filter surface of the combustion chamber screen, the gas then may flow through the said flow cross-section in the direction of the diffuser-side end of the chamber.

Since the flow cross-section between the combustion chamber screen and the inner face of the chamber wall, when viewed from the igniter-side end of the combustion chamber screen toward the diffuser-side end thereof, is continuously increasing, along the entire length or longitudinal extension of the combustion chamber screen, respectively, gas may flow into the clearance without the flow rate of the gas having to increase. Because of this fact, there is a uniform flow through the combustion chamber screen across the entire filter surface and thus it is optimally used.

In other words, a cross-section of a clearance through which combustion gas can flow and which is formed between the combustion chamber screen and the inner face of the chamber wall increases, especially continuously, in the longitudinal direction of the inflator, preferably in a main flow direction of the combustion gas. The clearance surrounds the outer face of the combustion chamber screen.

Due to the configuration of the combustion chamber screen according to the invention, back pressure is prevented from occurring at the end of the outlet of the chamber and, resp., in the area of the diffuser-side end of the combustion chamber screen.

In one embodiment of the invention, the combustion chamber screen may include a flange, formed especially fully circumferentially, at the diffuser-side end. The flange may be ring-shaped, for example. Preferably, the flange is rotationally symmetric. Gas outlet openings may be formed in the flange. Moreover, it is possible that the flange is formed such that, when it abuts on the inner face of the chamber wall, it forms gas flow openings. In other words, the edge of the flange may include recesses, wherein gas flow openings are formed due to the recesses, when the flange abuts on the inner face of the chamber wall. The flange of the combustion chamber screen serves especially for fastening the combustion chamber screen and, resp., it also serves as a centering aid or else positioning aid of the combustion chamber screen during assembly thereof while the inflator is manufactured.

Further, the combustion chamber screen may rest or abut on a shoulder element at the diffuser-side end. The shoulder element may especially comprise a hollow-cylindrical or hollow truncated cone-shaped intermediate gas chamber. The intermediate gas chamber may form a fluid communication from the described clearance to the chamber outlet, especially to the compression gas chamber outlet or, resp., combustion chamber outlet. The hollow-cylindrical or hollow truncated cone-shaped intermediate gas chamber is formed especially by a (rotationally symmetric) wall, the wall including gas flow openings. Thus, gas may flow from the described clearance into the hollow cylindrical or hollow truncated cone-shaped intermediate gas chamber.

The flange of the combustion chamber screen may preferably be connected to the shoulder element.

In one embodiment, in which the combustion chamber screen has no flange, the shoulder element preferably includes a shoulder flange. Said shoulder flange, too, may be rotationally symmetric. The shoulder flange may include gas flow openings. In another embodiment of the invention, it is possible that the shoulder flange has such circumferential edge comprising recesses so that gas flow openings are formed when the shoulder flange abuts on the inner face of the chamber wall.

It is possible that the shoulder element includes a sleeve portion pointing to the ignition unit into which the diffuser-side end of the combustion chamber screen is inserted. Preferably, such sleeve portion is combined with the described shoulder flange. The sleeve portion is preferably configured such that the opening of the sleeve is formed in the direction of the ignition unit so that the diffuser-side end of the combustion chamber screen can be inserted and, resp., fitted or pressed into the sleeve portion. Preferably, the diffuser-side end of the combustion chamber screen rests on and, resp., contacts the shoulder element. In particular, the diffuser-side end of the combustion chamber screen may contact the shoulder flange.

The shoulder element especially serves as an element axially supporting the combustion chamber screen. Preferably, the wall forming the hollow truncated cone-shaped or hollow-cylindrical intermediate gas chamber is connected to or abuts on the inner face of the chamber, especially the compressed gas chamber or, resp., combustion chamber.

It is possible for the combustion chamber screen to be formed in one piece, i.e. monolithically, with the shoulder element.

In another embodiment of the invention, the combustion chamber screen may be inserted at the diffuser-side end into a pot-shaped or cup-shaped element in such a way that the combustion chamber screen rests on a pot bottom or cup bottom of the element. The pot bottom or cup bottom of the element is a shoulder surface serving as a closure of the combustion chamber screen. This prevents gas or, resp., combustion gas from escaping at the diffuser-side end of the combustion chamber screen in the axial direction. The pot bottom or cup bottom of the element causes the combustion gas to flow through the filter surface of the combustion chamber screen into the said clearance.

The combustion chamber screen, in other words, encloses part of the propellant bed and includes discharge openings for the combustion gases from the propellant bed. In one embodiment of the inflator, also cold gas may flow through the filter surface of the combustion chamber screen. Accordingly, the openings in the combustion chamber screen are so small that the propellant tablets, propellant pellets or propellant granules are withheld.

After the gas has flown out of the combustion chamber screen, the combustion gas and the clinker particles contained impact on the cold inner face of the chamber wall so that the clinker is deposited there and the gas is cooled. Due to a shoulder element formed or due to a pot-shaped or cup-shaped element, the diffuser-side end of the combustion chamber screen is closed so that no gas may flow out of the diffuser-side end, especially in the axial direction.

The pot-shaped or cup-shaped element may have at least two tabs and/or one circumferential flange on the circumferential side. With the aid of the tabs and/or the circumferential flange, the pot-shaped or cup-shaped element can be centered within the inflator housing, especially inside the chamber wall. Between the circumferential flange and/or the tabs of the pot-shaped or cup-shaped element and the inner face of the chamber wall an, especially ring-shaped, passage is formed through which the gas may flow out of the clearance in the direction of the chamber outlet, especially of the compressed gas chamber outlet or combustion chamber outlet. Preferably, the passage has a small gap width, especially of about 1-2 mm, so that in said portion the combustion gas can be further cooled and clinker can be deposited.

Of preference, the inflator has a support member arranged axially downstream of the pot-shaped or cup-shaped element in the longitudinal direction of the inflator, preferably in the main flow direction of the combustion gas. The support member may be made e.g. from expanded metal and/or perforated sheet and/or fabric and/or knitted mesh and/or wire mesh. The support member axially supports the pot-shaped or cup-shaped element and directs the gas flow or allows the gas flow to flow preferably radially inwardly in the direction of the longitudinal axis of the inflator. Even in the area of the support member the combustion gas is continued to be cooled. Moreover, clinker can be further deposited at the support member.

In addition, the inflator may include a plugging arranged axially downstream of the support member in the longitudinal direction of the inflator, preferably in the main flow direction of the combustion gas, and/or a disk having openings.

Due to the shown modular structure of the inflator according to the invention, extremely simple and inexpensive component parts may be used.

Another independent aspect of the invention relates to an airbag module comprising an inflator according to the invention and an airbag inflatable by the inflator according to the invention and a fastening device for attaching the airbag module to a vehicle. Especially, the independent aspect of the invention relates to an airbag module comprising a hybrid inflator according to the invention or a pyrotechnical inflator according to the invention. Advantages similar to those already stated in connection with the inflator according to the invention will be resulting.

Another independent aspect of the invention relates to a motor vehicle safety system, especially for the protection of a person, e.g. a vehicle occupant or pedestrian, comprising an inflator according to the invention, an airbag inflatable by said inflator as part of an airbag module, especially an airbag module according to the invention, and an electronic control unit by means of which the inflator according to the invention can be activated, if a release situation is given. Advantages similar to those already stated in connection with the inflator according to the invention will be resulting.

BRIEF DESCRIPTION OF THE DRAWINGS

Hereinafter, the invention shall be illustrated in detail by way of example embodiments with reference to the attached schematic sketches, wherein.

In the following, identical reference numerals will be used for like and equally acting parts.

DESCRIPTION

Figure 1:
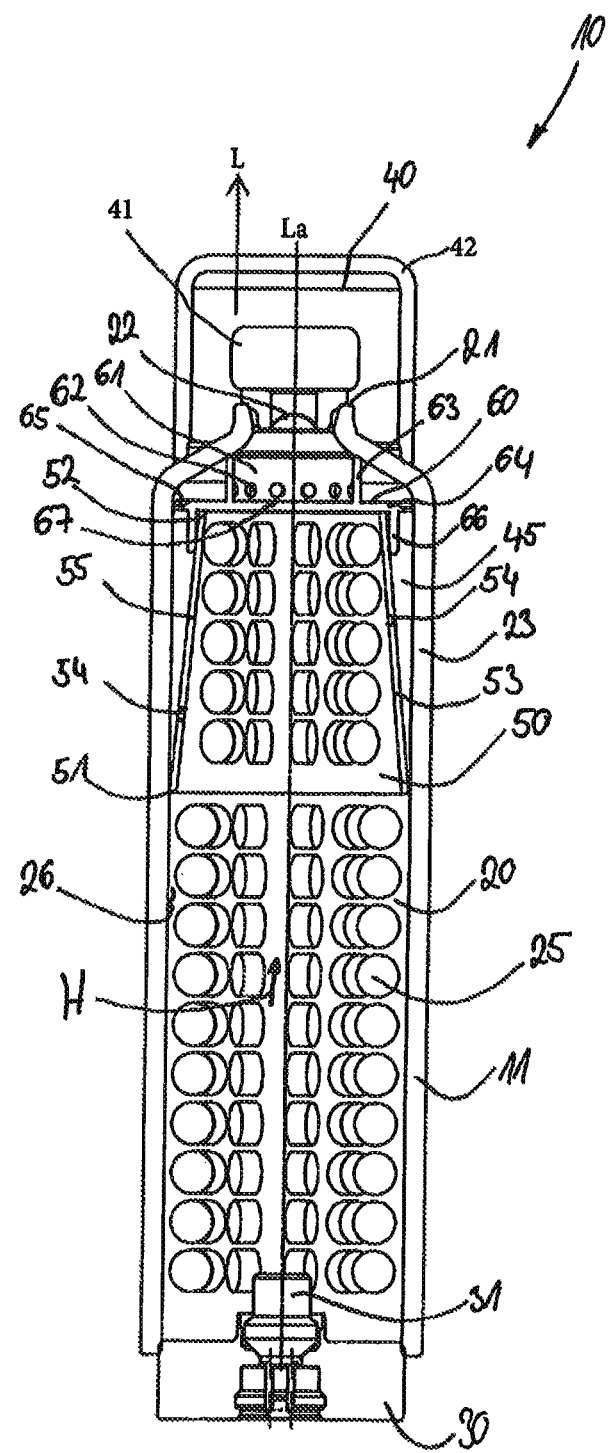
FIG. 1 shows a hybrid inflator according to the invention as described in a first example embodiment.

The inflator 10 illustrated in FIG. 1 is a hybrid inflator. It comprises an elongate tubular housing 11. The inflator 10 serves for inflating a gas bag, especially an airbag. The inflator 10 comprises a central elongate cylindrical chamber 20. Said chamber is a compressed gas chamber. Moreover, the inflator 10 comprises an ignition unit 30. The chamber 20 is closed by a bursting element 22 at its diffuser-side outlet 21.

The chamber 20 is filled with a compressed gas of helium, a helium/argon mixture or a helium-argon-oxygen mixture at a pressure of from 240 to 1,500 bars.

The ignition unit 30 comprises the igniter 31. The igniter 31 protrudes into the chamber 20. With the aid of the igniter 31, the propellant bed 25 present in the chamber 20 can be ignited. The propellant bed 25 may be formed, for example, of granules and/or compressed pellets and/or extrudate bodies with an axial through-passage and/or extrudate bodies without an axial through-passage.

The inflator 10 further comprises a diffuser chamber 40 which is comprised by a diffuser 42. Said diffuser chamber 40 includes diffuser openings 41 through which gas generated may flow out and may flow into an airbag, for example.

In the chamber 20 a combustion chamber screen 50 having an igniter-side end 51 and a diffuser-side end 52 is disposed. The combustion chamber screen 50 is tapered and, resp., is formed conically in the longitudinal direction L of the inflator 10. The longitudinal direction L of the inflator 10 is a direction pointing from the igniter 31 toward the diffuser 42, with the longitudinal direction L being oriented substantially in parallel to the longitudinal axis La of the inflator. Further, there is a main flow direction H of a combustion gas which can be generated, upon or after activation of the inflator, in the chamber 20 by combustion of the propellant bed 25. The main flow direction H of the combustion gas equally extends substantially in parallel to the longitudinal axis La of the inflator. Thus, the combustion chamber screen 50 is also tapered, especially conically, in the main flow direction H of the combustion gas. The combustion chamber screen 50 has a filter surface 53. Said filter surface 53 includes filter openings 54. The combustion chamber screen 50 may be formed of expanded metal or perforated sheet or fabric. In the shown cross-section, the shape of the combustion chamber screen 50, viz. the shape of a tapered cone segment is visible. The igniter-side end 51 does not abut on the ignition unit 30, as is evident from FIG. 1. Rather, said end 51 points to the ignition unit 30. The igniter-side end 51 is dimensioned so that the combustion chamber screen 50 is adjacent to the inner face 26 of the chamber wall 23 in slight press-fit.

It is evident that also inside the combustion chamber screen 50 parts of the propellant bed 25 are introduced. Between the combustion chamber screen 50, especially between the outer face 55 of the combustion chamber screen 50 and the inner face 26 of the chamber wall 23, a clearance 45 is formed. The igniter-side end 51 of the combustion chamber screen 50 is preferably formed and, resp., is located in such press-fit with respect to the chamber wall 23 that the propellant does not reach the clearance 45.

It is evident that the flow cross-section of the clearance 45 continuously increases in the main flow direction H of the combustion gas. The flow cross-section of the clearance 45 continuously increases to the same extent as the cross-section of the combustion chamber screen 50 continuously decreases.

The combustion chamber screen 50 rests on a shoulder element 60 at the diffuser-side end 52. The shoulder element 60 comprises a hollow-cylindrical intermediate gas chamber 61. The intermediate gas chamber 61 has inlet openings 2. The gas inlet openings 62 are formed in a wall 63 of the intermediate gas chamber 61. The hollow-cylindrical intermediate gas chamber 61 is formed on a shoulder element flange 64. The shoulder element flange 64 in turn has gas flow openings 65. The gas flow openings 65 create a fluid communication from the clearance 45 in the direction of the intermediate gas chamber 61. The gas escaping through the combustion chamber screen 50, especially through the filter openings 54, first flows in the direction of the shoulder element flange 64 so as to subsequently get through the gas flow openings 65 and the inlet openings 62 into the intermediate gas chamber 61. When the pressure in the intermediate gas chamber 61 is sufficiently high, then the bursting element 22 can be made to burst and thus the chamber 20 can be opened at its diffuser-side outlet 21. After bursting of the bursting element 22, the gas then gets into the diffuser chamber 40 and through diffusor openings 41 into an airbag, for example.

The shoulder element 60 further includes a sleeve portion 66 pointing to the ignition unit 30. The diffuser-side end 52 of the combustion chamber screen 50 is inserted in the sleeve portion 66. In particular, the diffuser-side end 52 rests on the shoulder element flange 64. The sleeve portion 66 thus serves for fastening the combustion chamber screen 50. The shoulder element 60, especially a shoulder surface 67 of the shoulder element 60, serves for sealing the combustion chamber screen 50 in the main flow direction H. Hence, no combustion gas can escape at the diffuser-side end 52 of the combustion chamber screen 50 from the interior of the combustion chamber screen 50 in the axial direction.

In the operating case of the inflator 10, the combustion chamber screen 50 is passed through from inside, i.e. from its interior, starting from the longitudinal axis La of the inflator 10, to the outside, preferably in the radial direction. This is due to the filter openings 54 in the combustion chamber screen 50. Subsequently, the gas flows along the inner face 26 of the chamber wall 23 which in the present case is the wall of a cold gas tank. In so doing, clinker deposits at the combustion chamber screen 50 as well as at the inner face 26 of the chamber wall 23. Since the flow cross-section of the clearance 45 continuously increases between the combustion chamber screen 50 and the inner face 26 of the chamber wall 23 in the longitudinal direction L of the inflator 10, viz. in the main flow direction H of the combustion gas, gas or combustion gas, resp., may flow into the clearance 45 along the entire length of the combustion chamber screen 50 without the flow rate of the gas having to be increased. As a consequence, gas flows uniformly through the combustion chamber screen 50 across the entire filter surface 53 so that the combustion chamber screen is optimally used.

Figure 2:
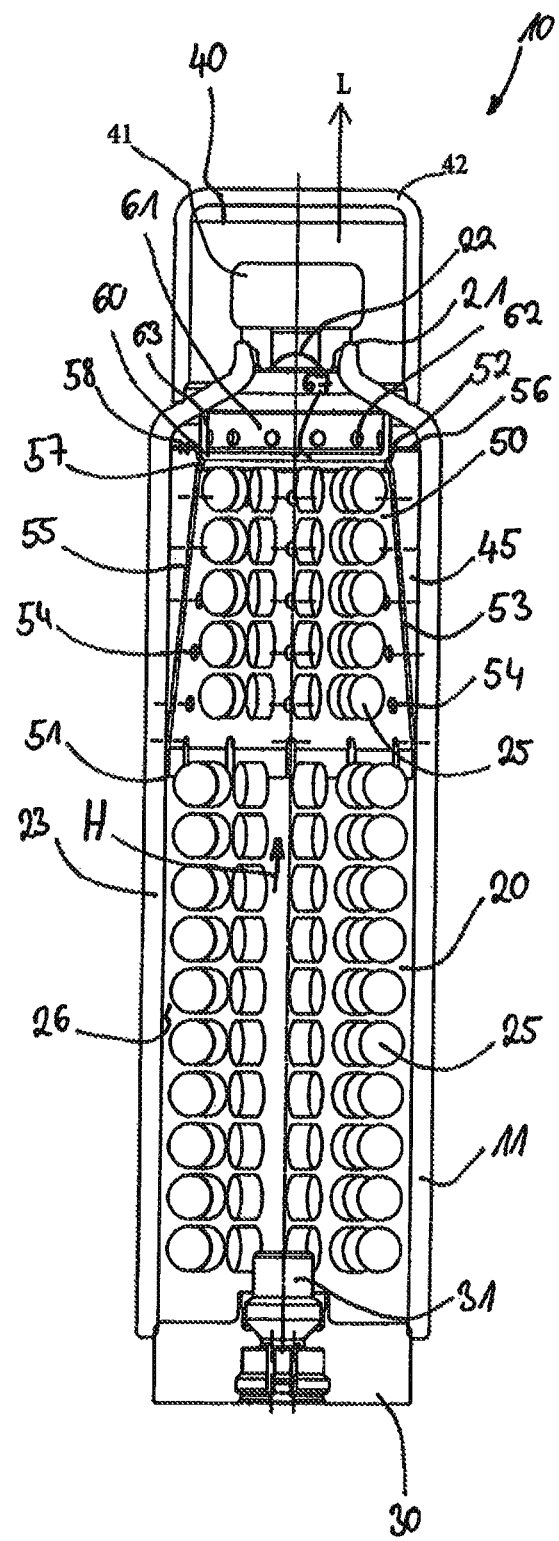
FIG. 2 shows a hybrid inflator according to the invention as described in a second example embodiment.

FIG. 2 illustrates another embodiment of an inflator 10 according to the invention. In this case, too, a hybrid inflator is concerned. It is largely in conformity with the inflator of FIG. 1. Hereinafter, merely the differences from the example embodiment of FIG. 1 shall be discussed.

The combustion chamber screen 50 according to the embodiment of FIG. 2 has a flange 56 which is configured fully circumferentially at the diffuser-side end 52. Moreover, a notch 57 is evident. The shoulder element 60 abuts on the notch 57 at the combustion chamber screen 50. The combustion chamber screen 50 may be connected to the shoulder element 60 at the notch 57 by means of a weld seam, for example. The shoulder element 60 in turn includes a hollow-cylindrical intermediate gas chamber 61. Via indicated flange openings 58, the gas present in the clearance 45 may reach the intermediate gas chamber 61 through the inlet openings 62. Preferably, the wall 63 of the intermediate gas chamber 61 contacts the inner face 26 of the chamber wall 23.

Figure 3:
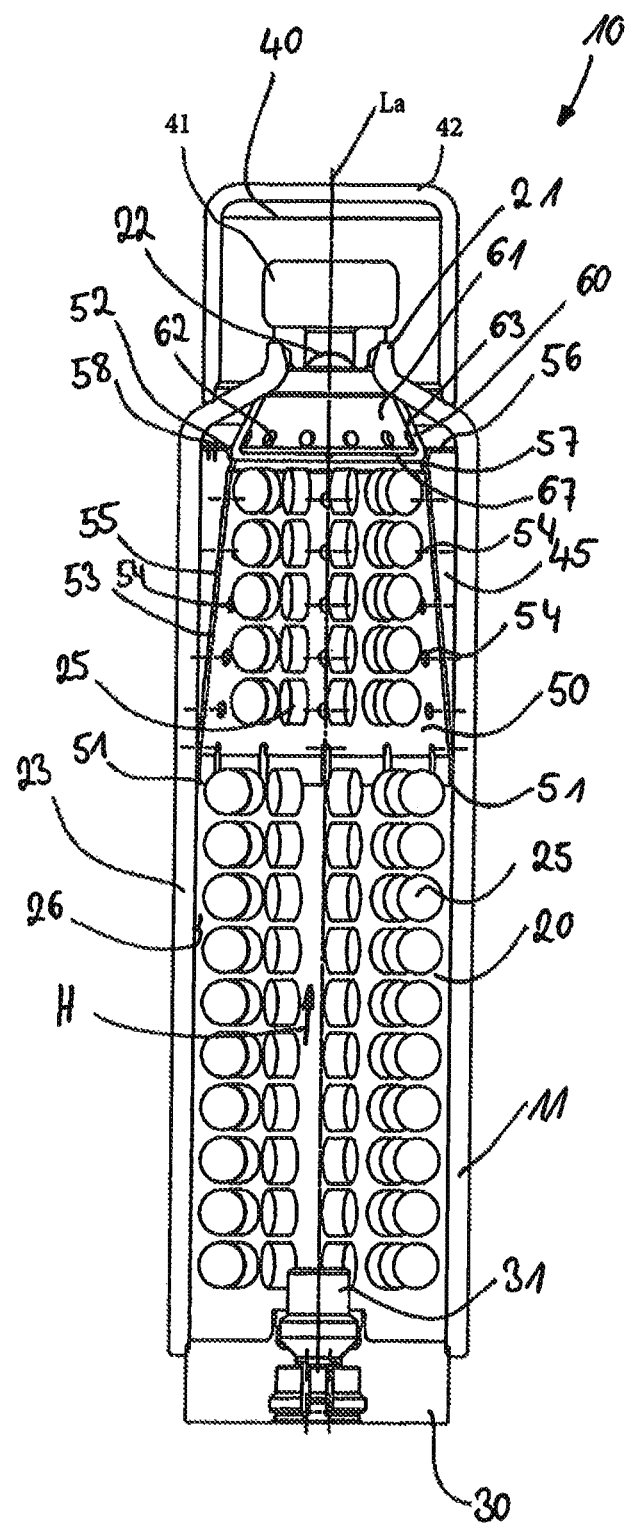
FIG. 3 shows a hybrid inflator according to the invention as described in a third example embodiment.

FIG. 3 illustrates another embodiment of an inflator 10 according to the invention, especially a hybrid inflator. It shows great conformities with the embodiment of FIG. 2. In the following, merely the differences from the example embodiment of FIG. 2 shall be discussed. The combustion chamber screen 50 equally includes a flange 56 as well as a notch 57 and flange openings 58. The difference is evident with respect to the shape of the shoulder element 60, especially the shape of the intermediate gas chamber 61. The wall 63 is shaped so that a hollow truncated cone shape is formed. This helps to provide a larger space for clinker deposition as compared to the embodiment of FIG. 2. This means that between the outer face of the wall 53 and the inner face 26 of the chamber wall 23 opposite to the wall 63 a relatively large space for clinker deposition may be formed. The shoulder element 60, especially the shoulder surface 67, serves for sealing the combustion chamber screen 50 in the longitudinal direction L of the inflator 10 and, resp., in the main flow direction H of the combustion gas. Therefore, the combustion gas is forced to flow through the filter openings 54 into the clearance 45.

Combinations of the embodiments of FIGS. 1 to 3 are possible. It is especially possible that the combustion chamber screen 50 and the shoulder element 60 are formed in one piece, i.e. monolithically.

Figure 4:
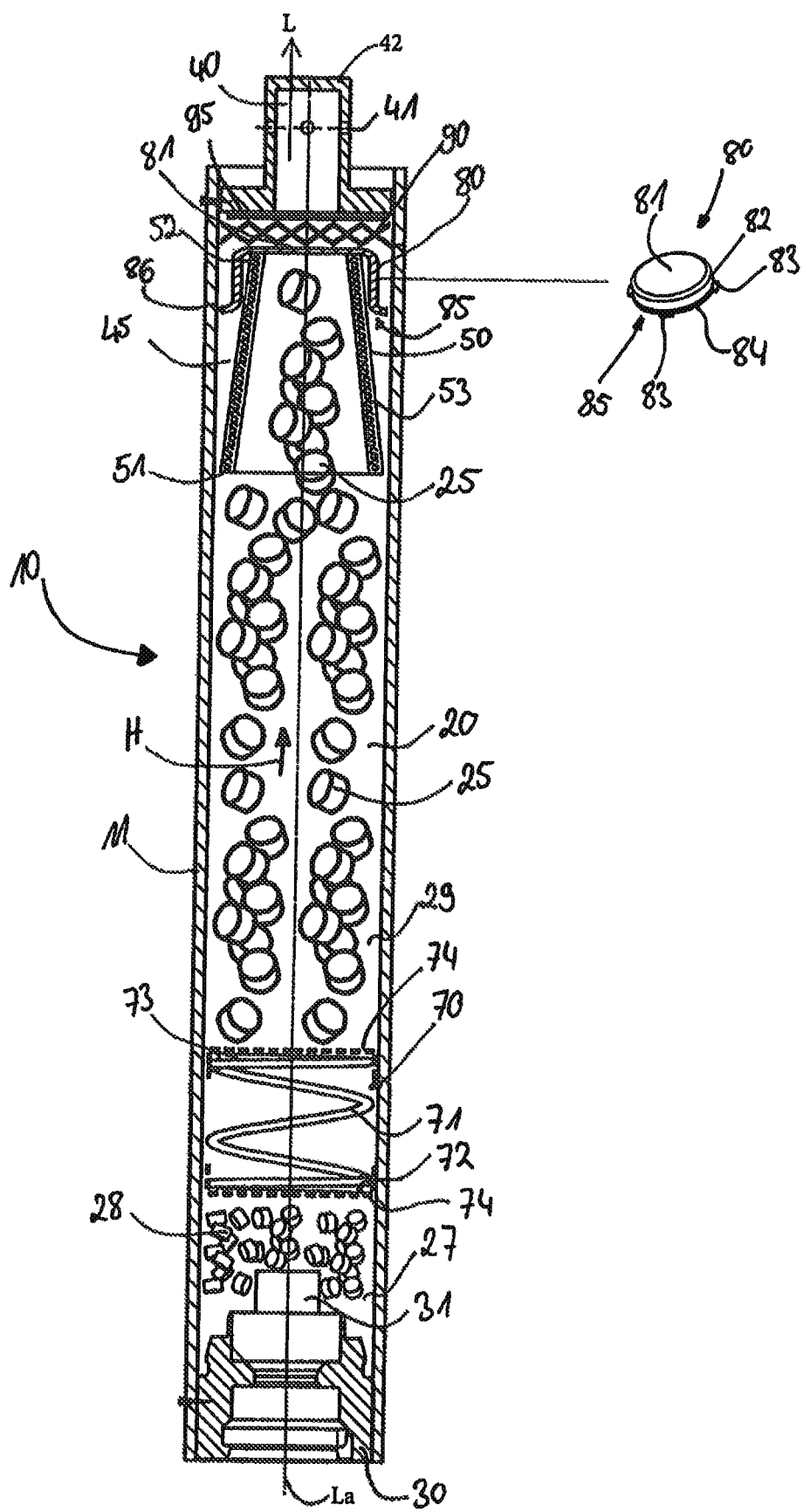
FIG. 4 shows a pyrotechnical inflator according to the invention as described in a first example embodiment.

In FIG. 4, another embodiment of an inflator 10 is shown. In this case, a pyrotechnical inflator is concerned. Said inflator 10 equally comprises an ignition unit 30 and a chamber 20, viz. a combustion chamber. In the latter likewise a propellant bed 25 is located. Concerning the embodiment of the propellant bed 25, the foregoing is applicable mutatis mutandis. In a first portion 27 of the chamber 20 an ignition means 28 is formed. The first portion 27 of the chamber 20 reaches from the ignition unit 30 to a filler element 70. The filler element 70 is arranged, in the idle state of the inflator 10, between the ignition means 28 and the propellant bed 25 in such a way that the filler element 70 fixes the ignition means 28 and the propellant bed 25 in position, viz. at their respective positions. A major relative movement of the individual propellant pellets and/or of individual pyrotechnic molded bodies is prevented by means of the filler element 70.

The filler element 70 is resilient and has plural component parts. In the shown example, the filler element 70 comprises a spring 71. The spring 71 is in the form of a coil spring and has two frontal end portions 72 and 73. The first frontal end portion 72 points in the direction of the ignition unit 30. The opposite second frontal end portion 73 points in the direction of the diffuser 42. The filler element 70 includes an especially perforated plate-type and/or lattice-type and/or expanded lattice-type cover element 74 at both frontal end portions 72 and 73 of the spring 71. Thus, in the operating case of the inflator 10, gas or, resp., combustion gas may flow through the filler element 70. The cover elements 74 may further have a screening function or a filtering function, respectively. The ignition means 28 cannot get through the filler element 70 into a second portion 29 of the chamber 20. In the operating case, ignition fumes of the igniter 31 may flow through the filler element 70, The ignition fumes generated thus flow in the direction of the second portion 29 of the chamber 20 and, consequently, in the direction of the propellant bed 25.

The combustion chamber screen 50 in the shown example is made from fabric. The filter openings 54 are resulting from mesh sizes of the fabric. The diffuser-side end 52 is inserted in a pot-shaped element 80. The combustion chamber screen, especially the diffuser-side end 52 of the combustion chamber screen 50, rests on a pot bottom 81 of the pot-shaped element 80. On a sidewall 82 of the pot-shaped element 80, especially at an igniter-side end 85 of the pot-shaped element 80, the pot-shaped element 80 has a narrow circumferential flange 84 and four tabs 83. The pot-shaped element 80 is centered within the chamber 20 via the tabs 83. A ring-shaped passage 86 through which the gas flowing out of the filter openings 54 of the combustion chamber screen 50 may flow in the direction of the diffuser 42 is formed between the pot-shaped element 80 and the inner face 26 of the chamber wall 23.

In FIG. 4 moreover a support element 90 is visible. Said support element 90 supports the pot-shaped element 80 in the axial direction and directs and, resp., lets flow the gas flow radially inwardly. The support element 90 may be made from wire mesh, expanded metal or similar material. The gas flowing through cools at the support element 90. Furthermore, clinker is deposited at the support element 90. Axially downstream of the support element 90 a plugging 95 is formed. Said plugging 95 may be formed of a metal foil such as a steel, aluminum or copper foil. As soon as, upon activation of the inflator 10, the plugging 95 has been opened or torn by appropriate pressure, the gas may pass the torn plugging 95 and may reach the diffuser chamber 40. Through the diffuser openings 41 the gas that has been cooled several times inside the inflator 10 and whose clinker components have been filtered several times may flow into an airbag.

Figure 5:
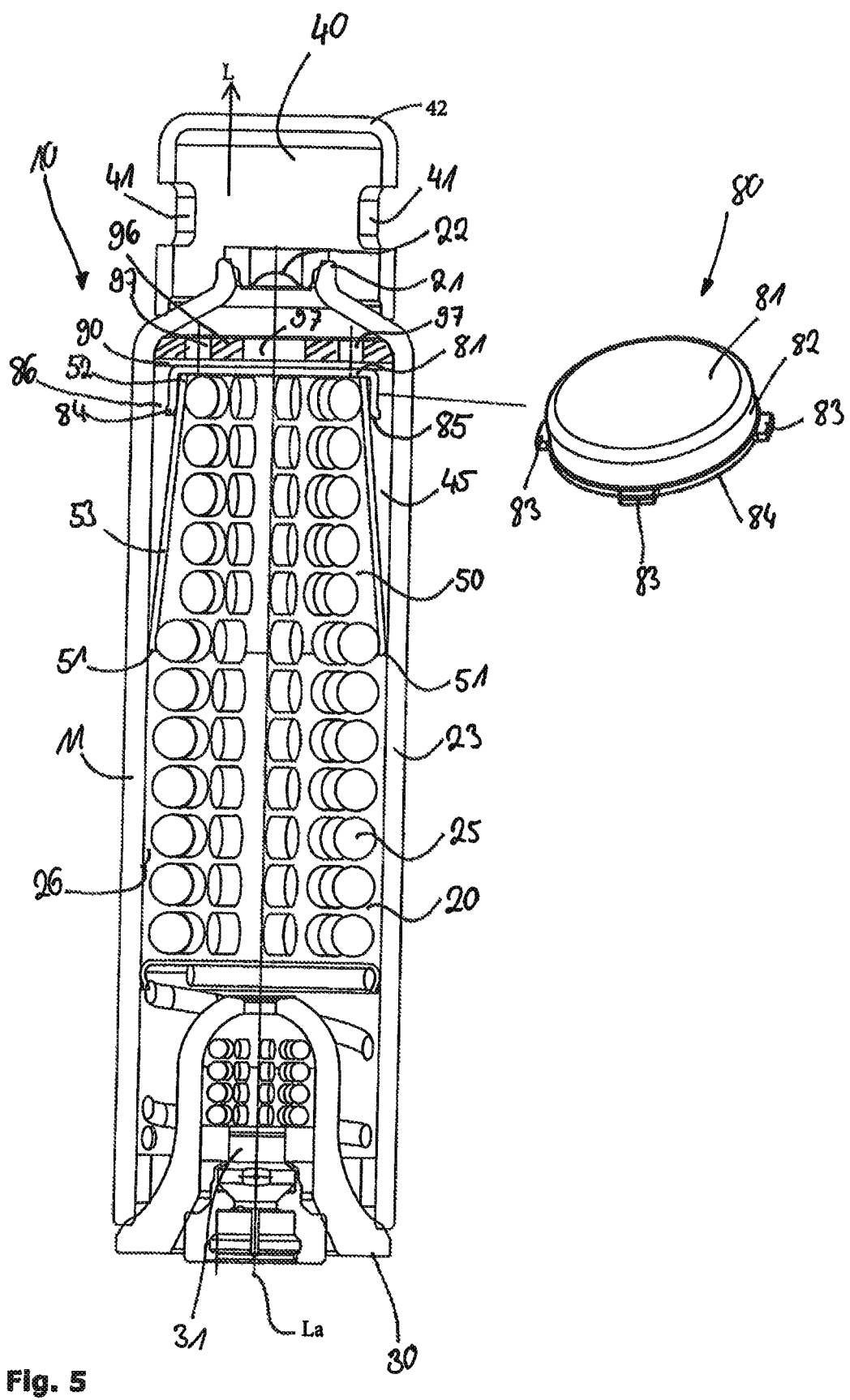
FIG. 5 shows a hybrid inflator according to the invention comprising a pot-shaped element.

FIG. 5 illustrates an inflator 10 which is in the form of a hybrid inflator. The structure of the combustion chamber screen 50 substantially corresponds to the structure of the combustion chamber screen according to the embodiment of FIG. 4. The pot-shaped element 80, too, is substantially configured just as in FIG. 4, The inflator 10 according to FIG. 5 is a hybrid inflator so that the chamber 20 is a compressed gas chamber. A support element 90 is in turn arranged axially downstream of the element 80, The support element 90 is preferably made from fabric.

A disk 96 including disk openings 97 is arranged axially downstream of the support element 90. As soon as the already repeatedly cooled gas has flown through the disk openings 97, the bursting element 22 of the compressed gas chamber 20 will be burst. Subsequently, the gas may flow through the diffuser openings 41 out of the inflator 10 and may flow into an airbag.

LIST OF REFERENCE NUMERALS

10 Inflator
11 housing
20 chamber
21 diffuser-side outlet
22 bursting element
23 chamber wall
25 propellant bed
26 inner face
27 first portion of chamber
28 ignition means
29 second portion of chamber
30 ignition unit
31 igniter
40 diffuser chamber
41 diffuser opening
42 diffuser
55 clearance
50 combustion chamber screen
51 igniter-side end
52 diffuser-side end
53 filter surface
54 filter opening
55 outer face
56 flange
57 notch
58 flange opening
60 shoulder element
61 intermediate gas chamber
62 inlet opening
63 wall
64 shoulder element flange
65 gas through-hole
66 sleeve portion
67 shoulder surface
70 filler element
71 spring
72 frontal end portion
73 frontal end portion
74 cover member
80 pot-shaped element
81 pot bottom
82 sidewall
83 tab
84 circumferential flange
85 igniter-side end
86 ring-shaped passage
90 support element
95 plugging
96 disk
97 disk opening
H main flow direction
L longitudinal direction
La longitudinal axis

The invention claimed is:

1. An inflator (10) comprising an ignition unit (30) having an igniter (31), a chamber (20) arranged axially downstream of the ignition unit (30) and a diffuser chamber (40) arranged axially downstream of the chamber (20) and being comprised by a diffuser (42), wherein a combustion chamber screen (50) having an igniter-side end (51) and a diffuser-side end (52) is arranged in the chamber (20), the combustion chamber screen (50) being conical and tapered from wide to narrow, in longitudinal direction (L) of the inflator (10) from the igniter (31) toward the diffuser (42).

2. The inflator (10) according to claim 1, wherein the combustion chamber screen (50) is made from expanded metal or perforated sheet or fabric, and wherein the combustion chamber screen (50) is configured as a tapered cone segment.

3. The inflator (10) according to claim 1, wherein a portion of the combustion chamber screen (50) having the maximum diameter is dimensioned so that the combustion chamber screen (50) abuts on an inner face (26) of a chamber wall (23) of the chamber (20) by means of press-fit.

4. The inflator (10) according to claim 1, wherein a cross-section of an annular clearance (45) through which combustion gas may flow and which is formed between the conical combustion chamber screen (50) and a cylindrical inner face (26) of a chamber wall (23) increases in the longitudinal direction (L) of the inflator (10).

5. The inflator (10) according to claim 1, wherein the combustion chamber screen (50) rests at the diffuser-side end (52) on a shoulder element (60) which comprises a hollow-cylindrical or hollow truncated cone-shaped intermediate gas chamber (61), wherein the combustion chamber screen (50) is formed integrally with the shoulder element (60).

6. The inflator (10) according to claim 5, wherein the combustion chamber screen (50) has a flange (56) at the diffuser-side end (52), wherein the flange (56) of the combustion chamber screen (50) is connected to the shoulder element (60).

7. The inflator (10) according to claim 5, wherein the shoulder element (60) includes a sleeve portion (66) pointing to the ignition unit (30) into which the diffuser-side end (52) of the combustion chamber screen (50) is inserted.

8. The inflator (10) according to claim 1, wherein the combustion chamber screen (50) is inserted in a pot-shaped element (80) at the diffuser-side end (52) so that the combustion chamber screen (50) rests on a pot bottom (81) of the pot-shaped element (80).

9. The inflator (10) according to claim 8, wherein the pot-shaped element (80) includes at least two tabs (83) and one circumferential flange (84) on the circumferential side.

10. The inflator (10) according to claim 8, wherein a support element (90) arranged axially downstream of the pot-shaped element (80) in the longitudinal direction (L) of the inflator (10), in a main flow direction (H) of combustion gas, which support element is made from expanded metal or perforated sheet or fabric or knitted wire or wire mesh.

11. The inflator (10) according to claim 10, comprising a plugging (95) or a disk (96) having disk openings (97) and being arranged axially downstream of the support element (90) in the longitudinal direction (L) of the inflator (10).

12. The inflator (10) according to claim 8, wherein the pot-shaped element (80) includes at least two tabs (83) on a circumferential side.

13. The inflator (10) according to claim 8, wherein the pot-shaped element (80) includes a circumferential flange (84) on a circumferential side.

14. An airbag module comprising the inflator (10) configured in accordance with claim 1, an airbag inflatable by the inflator (10) and a fastening device for attaching the airbag module to a vehicle.

15. A motor vehicle safety system comprising the inflator (10) configured in accordance with claim 1, an airbag inflatable by the inflator (10) and being part of an airbag module, and an electronic control unit by means of which the inflator (10) can be activated when a release situation is given.

16. The inflator (10) according to claim 1, wherein the combustion chamber screen (50) has a shape of a conical frustum.

17. An inflator (10) comprising an ignition unit (30) having an igniter (31), a chamber (20) arranged axially downstream of the ignition unit (30) and a diffuser chamber (40) arranged axially downstream of the chamber (20) and being comprised by a diffuser (42), wherein a combustion chamber screen (50) having an igniter-side end (51) and a diffuser-side end (52) is arranged in the chamber (20), the combustion chamber screen (50) being tapered in a longitudinal direction (L) of the inflator (10) from the igniter (31) toward the diffuser (42), wherein the combustion chamber screen (50) rests at the diffuser-side end (52) on a shoulder element (60) which comprises a hollow-cylindrical or hollow truncated cone-shaped intermediate gas chamber (61), wherein the combustion chamber screen (50) is formed integrally with the shoulder element (60), and wherein the shoulder element (60) includes a sleeve portion (66) pointing to the ignition unit (30) into which the diffuser-side end (52) of the combustion chamber screen (50) is inserted.

18. An inflator (10) comprising an ignition unit (30) having an igniter (31), a chamber (20) arranged axially downstream of the ignition unit (30) and a diffuser chamber (40) arranged axially downstream of the chamber (20) and being comprised by a diffuser (42), wherein a combustion chamber screen (50) having an igniter-side end (51) and a diffuser-side end (52) is arranged in the chamber (20), the combustion chamber screen (50) being tapered in a longitudinal direction (L) of the inflator (10) from the igniter (31) toward the diffuser (42), wherein the combustion chamber screen (50) is inserted in a pot-shaped element (80) at the diffuser-side end (52) so that the combustion chamber screen (50) rests on a pot bottom (81) of the pot-shaped element (80).

* * * * *